(12) United States Patent
Haltiner, Jr. et al.

(10) Patent No.: US 7,270,906 B2
(45) Date of Patent: Sep. 18, 2007

(54) SOLID-OXIDE FUEL CELL MODULE FOR A FUEL CELL STACK

(75) Inventors: Karl J. Haltiner, Jr., Fairport, NY (US); Haskell Simpkins, Grand Blane, MI (US); Subhasish Mukerjee, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 352 days.

(21) Appl. No.: 10/178,809

(22) Filed: Jun. 24, 2002

(65) Prior Publication Data

US 2003/0235746 A1 Dec. 25, 2003

(51) Int. Cl.
*H01M 2/00* (2006.01)
*H01M 2/02* (2006.01)
*H01M 2/14* (2006.01)

(52) U.S. Cl. .......................... 429/34; 429/38
(58) Field of Classification Search ................ 429/34, 429/35, 38, 39
See application file for complete search history.

(56) References Cited

U.S. PATENT DOCUMENTS

| | | | | |
|---|---|---|---|---|
| 5,270,129 A | * | 12/1993 | Ishida | 429/32 |
| 5,482,792 A | * | 1/1996 | Faita et al. | 429/30 |
| 5,678,647 A | * | 10/1997 | Wolfe et al. | 180/65.3 |
| 5,789,094 A | * | 8/1998 | Kusunoki et al. | 429/39 |
| 5,942,398 A | * | 8/1999 | Tartaglia et al. | 435/6 |
| 6,321,145 B1 | | 11/2001 | Rajashekara | |
| 6,423,896 B1 | | 7/2002 | Keegan | |
| 6,455,185 B2 | | 9/2002 | Bircann et al. | |
| 6,485,852 B1 | | 11/2002 | Miller et al. | |
| 6,509,113 B2 | | 1/2003 | Keegan | |
| 6,551,734 B1 | | 4/2003 | Simpkins et al. | |
| 6,562,496 B2 | | 5/2003 | Faville et al. | |
| 6,608,463 B1 | | 8/2003 | Kelly et al. | |
| 6,613,468 B2 | | 9/2003 | Simpkins et al. | |
| 6,613,469 B2 | | 9/2003 | Keegan | |
| 6,627,339 B2 | | 9/2003 | Haltiner, Jr. | |
| 6,630,264 B2 | | 10/2003 | Haltiner, Jr. et al. | |
| 6,824,910 B2 | * | 11/2004 | Chung et al. | 429/35 |

* cited by examiner

*Primary Examiner*—Stephen Kalafut
*Assistant Examiner*—Julian Mercado
(74) *Attorney, Agent, or Firm*—Paul L. Marshall (57) ABSTRACT

A fuel cell module having four sheet metal parts stamped from flat stock. The parts do not require any forming operations such as folding or dishing. Each part may have a different thickness to suit its function. The first part is a cell mounting frame for receiving and supporting a PEN fuel cell element. The second part is a cathode spacer, the thickness of the spacer determining the height of the cathode air flow field. The third part is an anode spacer, the thickness of spacer determining the height of the anode fuel flow field. The fourth part is a separator plate for separating the anode gas flow in one cell from the cathode air flow in an adjacent cell in a fuel cell stack. The four plates are joined by welding or brazing and may be assembled in any order or combination which suits the assembly process. Any desired number of modules may be stacked together to form a fuel cell stack.

23 Claims, 7 Drawing Sheets

SOLID-OXIDE FUEL CELL MODULE FOR A FUEL CELL STACK

STATEMENT REGARDING FEDERALLY SPONSORED RESEARCH OR DEVELOPMENT

This invention was made with United States Government support under Government Contract No. DE-FC26-02NT41246. The Government has certain rights in the invention.

TECHNICAL FIELD

The present invention relates to hydrogen/oxygen fuel cells; more particularly, to fuel cell stacks comprising a plurality of individual cells connected by interconnect elements; and most particularly, to a fuel cell module formed of four stamped metal plates and a PEN element.

BACKGROUND OF THE INVENTION

Fuel cells which generate electric current by the electrochemical combination of hydrogen and oxygen are well known. In one form of such a fuel cell, an anodic layer and a cathodic layer are deposited on opposite surfaces of an electrolyte formed of a ceramic solid oxide. Such a fuel cell is known in the art as a "solid oxide fuel cell" (SOFC). Hydrogen, either pure or reformed from hydrocarbons, is flowed along the outer surface of the anode and diffuses into the anode. Oxygen, typically from air, is flowed along the outer surface of the cathode and diffuses into the cathode where it is ionized. The oxygen anions transport through the electrolyte and combine with hydrogen ions to form water. The cathode and the anode are connected externally through a load to complete the circuit whereby electrons are transferred from the anode to the cathode. When hydrogen is derived from "reformed" hydrocarbons, the reformate gas includes CO which is converted to $CO_2$ at the anode via an oxidation process similar to the hydrogen oxidation. Reformed gasoline is a commonly used fuel in automotive fuel cell applications.

A single cell is capable of generating a relatively small voltage and wattage, typically between about 0.5 volt and about 1.0 volt, depending upon load, and less than about 2 watts per $cm^2$ of cell surface. Therefore, in practice it is usual to stack together, in electrical series, a plurality of cells. Because each anode and cathode must have a free space for passage of gas over its surface, the cells are separated by perimeter spacers which are vented to permit flow of gas to the anodes and cathodes as desired but which form seals on their axial surfaces to prevent gas leakage from the sides of the stack. The perimeter spacers include dielectric layers to insulate the interconnects from each other. Adjacent cells are connected electrically by "interconnect" elements in the stack, the outer surfaces of the anodes and cathodes being electrically connected to their respective interconnects by electrical contacts disposed within the gas-flow space, typically by a metallic foam which is readily gas-permeable or by conductive filaments. The outermost, or end, interconnects of the stack define electric terminals, or "current collectors," which may be connected across a load.

A complete SOFC system typically includes auxiliary subsystems for, among other requirements, generating fuel by reforming hydrocarbons; tempering the reformate fuel and air entering the stack; providing air to the hydrocarbon reformer; providing air to the cathodes for reaction with hydrogen in the fuel cell stack; providing air for cooling the fuel cell stack; providing combustion air to an afterburner for unspent fuel exiting the stack; and providing cooling air to the afterburner and the stack. A complete SOFC assembly also includes appropriate piping and valving, as well as a programmable electronic control unit (ECU) for managing the activities of the subsystems simultaneously.

The various components of a fuel cell stack, possibly including the fuel cells themselves, the anode and cathode spacers which create the flow passageways across the anodes and cathodes, the perimeter seals, and the electrical interconnects, are rectangular and are perforated along all four edges. When the components are stacked up, the perforations define fuel and air distribution manifolds, known as "chimneys," within the fuel cell stack perpendicular to the planes of the stacked fuel cells, through which fuel and air may be supplied to and removed from the individual fuel cells.

It is possible to form the frame and interconnect assembly from two pieces of sheet metal which are stamped and formed. However, this fabrication method requires space for radius of the forming folds which reduces space available for cell active area when the overall volume of the assembly is fixed by use constraints. In addition, there are regions in the sealing surfaces between one cell/frame assembly and the next where the metal parts are unsupported or cantilevered. As a result, the metal parts can creep at the high operating temperatures required for a solid-oxide fuel cell, causing failure in the seal joints and potentially a catastrophic collapse of the stack structure. Other fabrication methods often used require costly machining of the components used in the frame and interconnect assembly.

It is a principal object of the present invention to provide an improved fuel cell assembly wherein the assembly is formed of inexpensive fuel cell modules and components.

It is a further object of the invention to provide such a fuel cell module formed from four stamped sheet metal parts and a PEN cell element.

SUMMARY OF THE INVENTION

Briefly described, a fuel cell module in accordance with the invention has four sheet metal parts stamped from flat stock which do not require any forming operations such as folding or dishing. Each part has a different thickness to suit its function. Because the parts are flat, stacked on top of one another, and metallurgically joinable, the cell active area is maximized because there is no wasted space in radial corners.

The first part is a cell mounting frame for receiving and supporting a PEN fuel cell element. The second part is a cathode spacer, the thickness of the spacer determining the height of the cathode air flow field. The third part is an anode spacer, the thickness of spacer determining the height of the anode fuel flow field. The fourth part is a separator plate for separating the anode gas flow in one cell from the cathode air flow in an adjacent cell in a fuel cell stack. The four plates are joined by welding or brazing and may be assembled in any order or combination which suits the assembly process. Any desired number of modules may be stacked together to form a fuel cell stack.

Each of the plates is provided along its edges with a plurality of openings which, in a stack, define manifolds for providing fuel and air to, and removing spent fuel and air from, flow passageways across the anodes and cathodes in a fuel cell stack.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
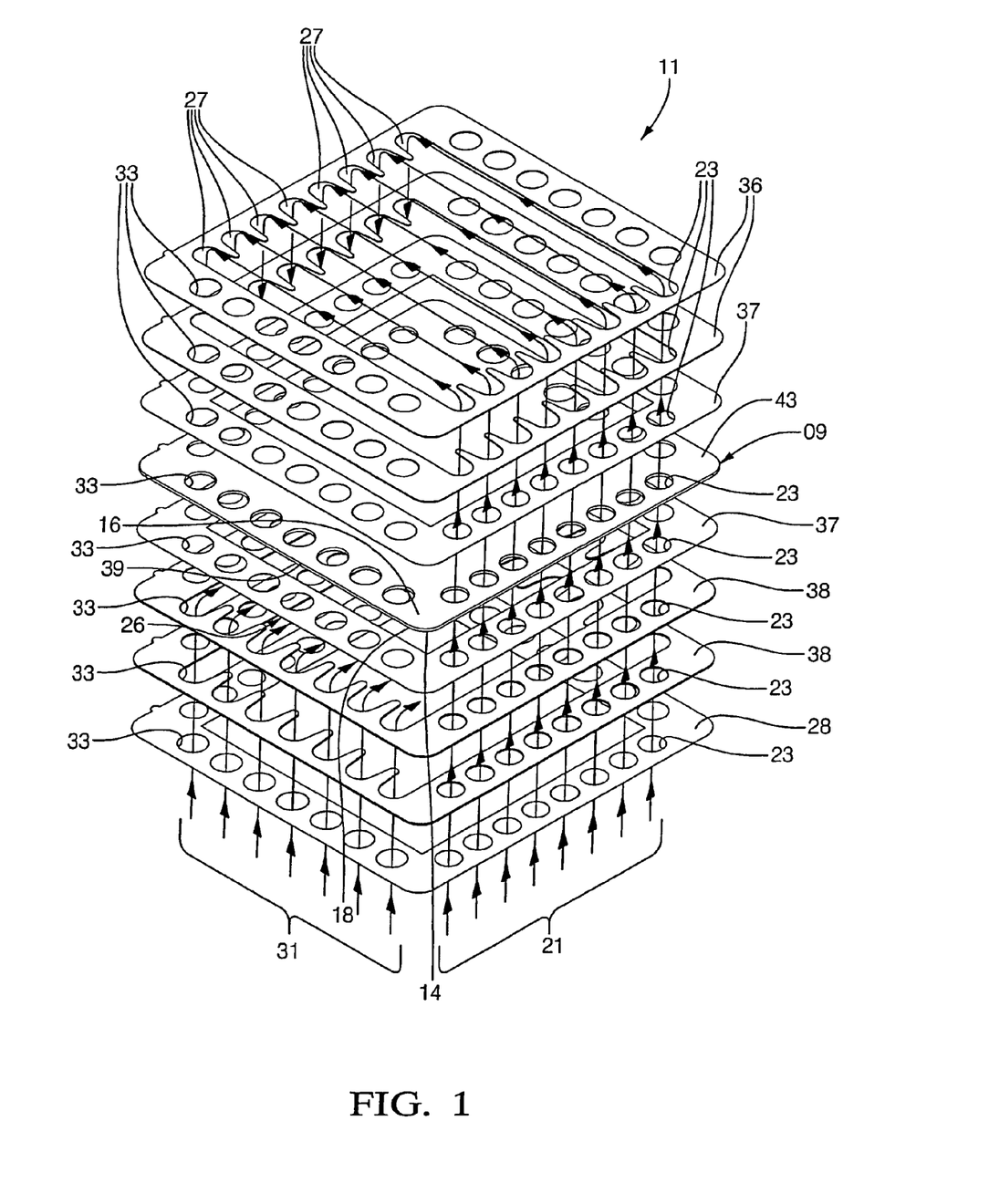
FIG. 1 is an exploded isometric view of a single solid oxide fuel cell, showing the various elements and the flow paths of fuel and oxygen through the cell.
Figure 2:
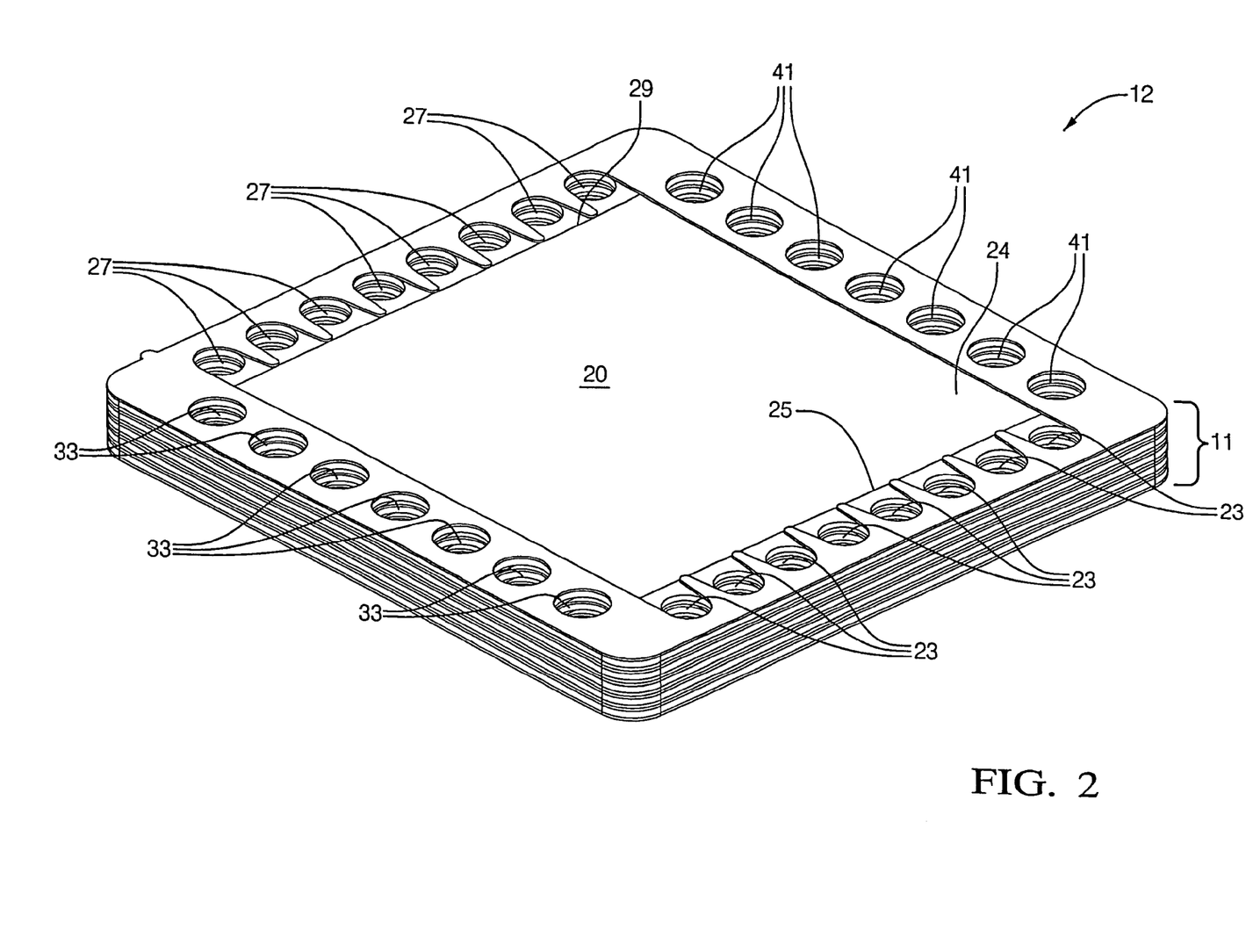
FIG. 2 is an isometric view of a fuel-cell stack comprising five cells like the cell shown in FIG. 1.
Figure 3:
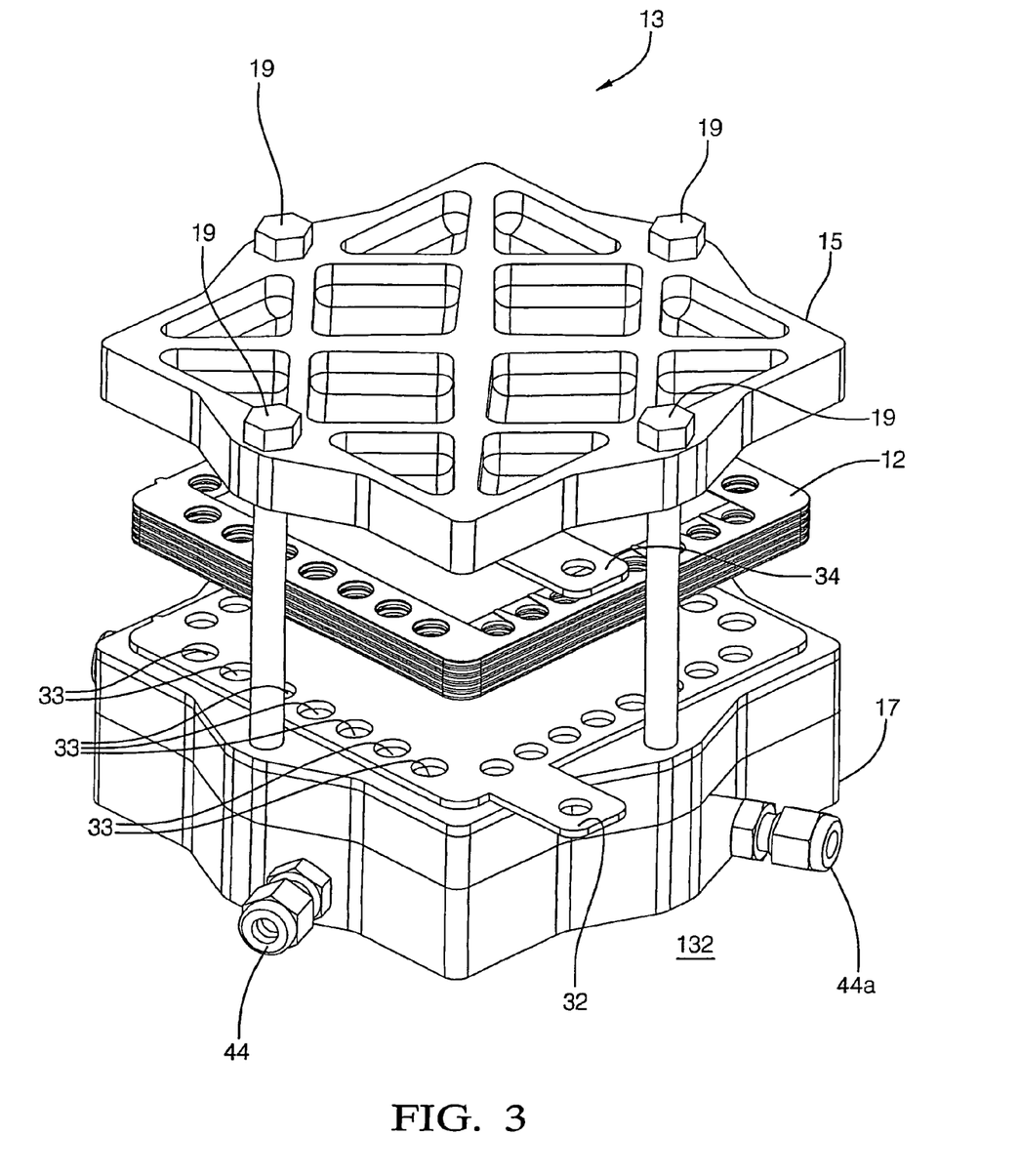
FIG. 3 is an isometric view like that shown in FIG. 2, partially exploded, showing the addition of current collectors, end plates, and bolts to form a complete fuel cell stack ready for use.

FIGS. 1 through 3 are useful in describing generally the structure of a multiple fuel cell stack assembly. FIGS. 4 through 10 are illustrative of improved fuel cell assemblies in accordance with the invention.

Referring to FIGS. 1 and 2, an individual fuel cell 11 includes a multilayer fuel cell element 09 comprising an electrolyte 14 (E) having an anode 16 or positive element (P) deposited on a first surface thereof and a cathode 18 or negative element (N) deposited on a second surface thereof. Thus, element 09, which is the actual "fuel cell," is known in the art by the acronym PEN. Passage 24 for flow of fuel 21 across the free surface 20 of anode 16 is provided by first cut-out spacers 36 sealed to anode 16 by peripheral seal 37, and passage 26 for flow of air 31 across the free surface of cathode 18 is provided by second cut-out spacers 38 sealed to cathode 18 by another peripheral seal 37. Fuel 21, typically in the form of hydrogen or reformate gas, is provided at a first edge 25 of anode surface 20 via supply conduits 23 formed in each element and is removed via exhaust conduits 27 provided at a second and opposite edge 29 of anode surface 20. Oxygen, typically in the form of air, is provided via supply conduits 33 to passages 26 at a first edge 39 of cathode 18 and is removed via exhaust conduits 41 at a second and opposite edge 43 of cathode 18.

Referring to FIG. 3, a plurality of fuel cells 11 may be stacked together to form a stack 12, five such cells being shown in FIG. 2. In a complete working fuel cell 13, stack 12 is sandwiched between an anodic current collector 34 and a cathodic current collector 32 which in turn are sandwiched between a top plate 15 and a gas-manifold base 17, the entire assembly being bound together by bolts 19 extending through bores in top plate 15 and threadedly received in bores in base 17. Air is provided to base 17 for supply to conduits 33 via a first connector 44. In the stack, the cathode air and anode fuel conduits define distribution manifolds, or "chimneys", as described above.

Referring to FIGS. 4 through 10, an improved structure for a modular fuel cell 50 (FIG. 6) includes four sheet metal parts stamped from flat stock which do not require any forming operations such as folding or dishing. Each part may have a different thickness to suit its function. Because the parts are flat, stacked on top of one another, and metallurgically joinable, the cell active area is maximized because there is no wasted space in radial corners.

The first sheet is the cell mounting frame 52. It needs to be thick enough only to provide sufficient structure to allow the fuel cell element (PEN) 09 (refer to FIG. 1) to be mounted to it. Frame 52 has a central opening 54 smaller than the external dimensions of the PEN such that the surface of electrolyte 14 outboard of cathode layer 18 can be bonded and sealed to mounting frame 52. Cathode layer 18 does not touch frame 52, being separated by a gap 53 (FIG. 8), and is therefore electrically isolated from frame 52. Opening 54 in frame 52 allows the surface of cathode 18 to be exposed to cathode air flow in the fuel cell assembly. The anode side of the PEN could be mounted to the PEN frame 52 as an alternate configuration, if desired. Frame 52 also has openings 33',41' for passage of cathode air and openings 23',27' for passage of fuel to supply all the cells in a stack. None of these openings is open in the plane of frame 52 and therefore gas cannot flow out of the manifold chimneys in this part. The PEN does not extend to the outer edges of frame 52 nor to the air or fuel openings. Thus, the PEN does not require openings formed in it which are difficult to fabricate and which increase the chance of PEN cracking. Moreover, the edges of the PEN do not require sealing as they otherwise would because of the porous anode material.

Figure 7:
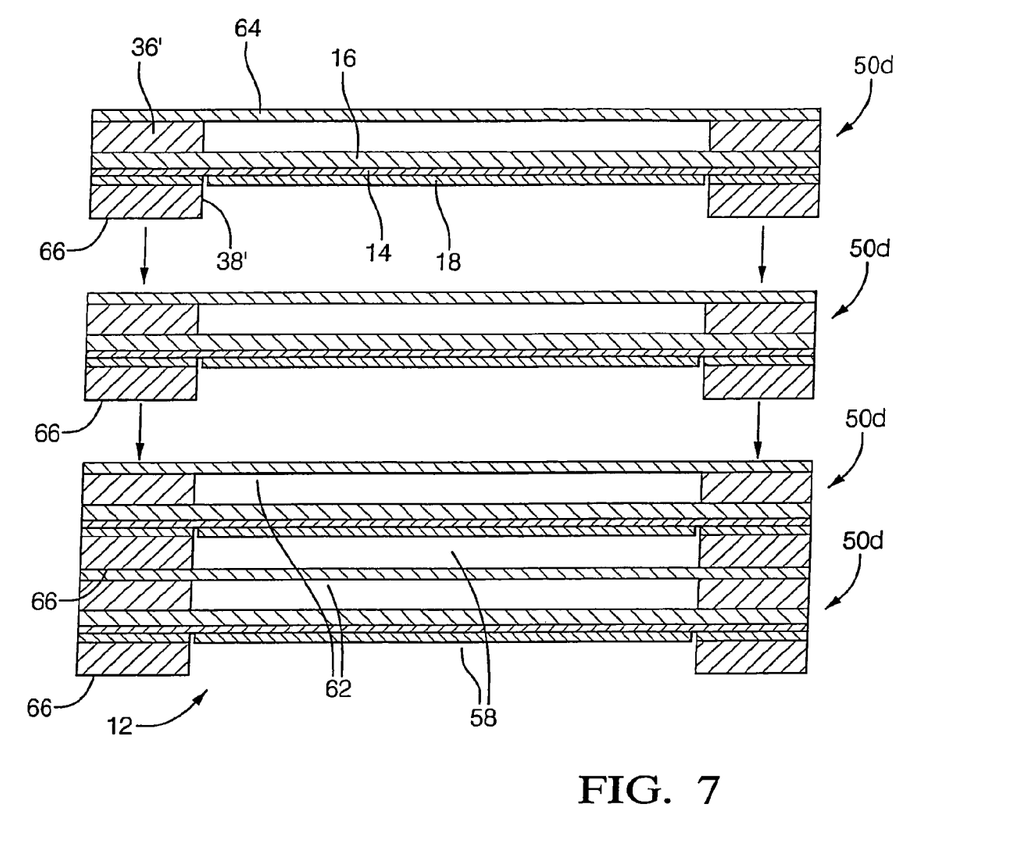
FIG. 7 is an elevational cross-sectional view of fuel cell modules in accordance with the invention stacked together to form a fuel cell stack.

The second sheet is a cathode spacer 38', analogous to spacer 38 in FIG. 1. The thickness of spacer 38' determines the height of the cathode air flow field 58 (FIG. 7). Anode gas openings 23',27' are not open in the plane of spacer 38' so that anode gas is contained in the manifold chimneys. Cathode openings 33',41', however, are open in the plane of the spacer to allow cathode air to flow across the surface of the cathode from supply opening 33' to return opening 41'. Spacer 38' is positioned on the cathode side of cell mounting frame 52.

The third sheet is an anode spacer 36', analogous to spacer 36 in FIG. 1. The thickness of spacer 36' determines the height of the anode flow field 62 (FIG. 7). Cathode gas openings 33',41' are not open in the plane of spacer 36' so that cathode gas is contained in the manifold chimneys. Anode openings 23',27', however, are open in the plane of the spacer to allow anode gas to flow across the surface of the anode from supply opening 23' to return opening 27'. Spacer 36' is positioned on the anode side of cell mounting frame 52 of an adjacent fuel cell module.

Figure 4:
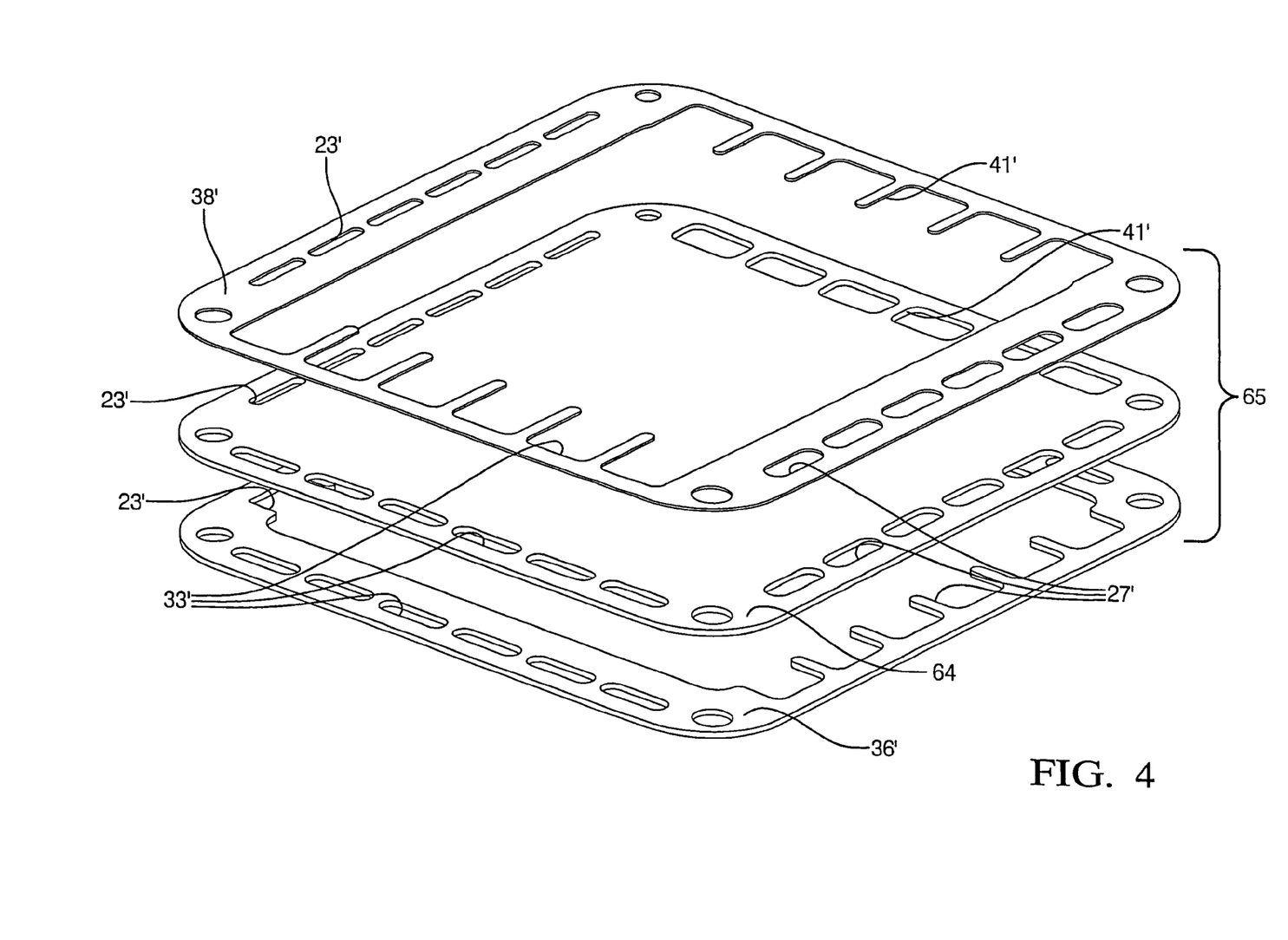
FIG. 4 is an exploded isometric view of a separator subassembly in accordance with the invention.
Figure 5:
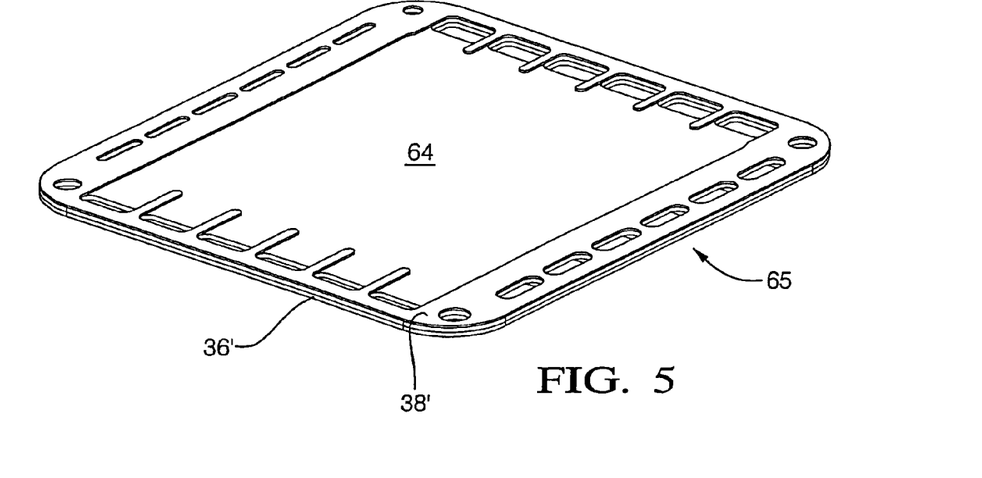
FIG. 5 is an isometric view of the subassembly shown in FIG. 4.
Figure 6:
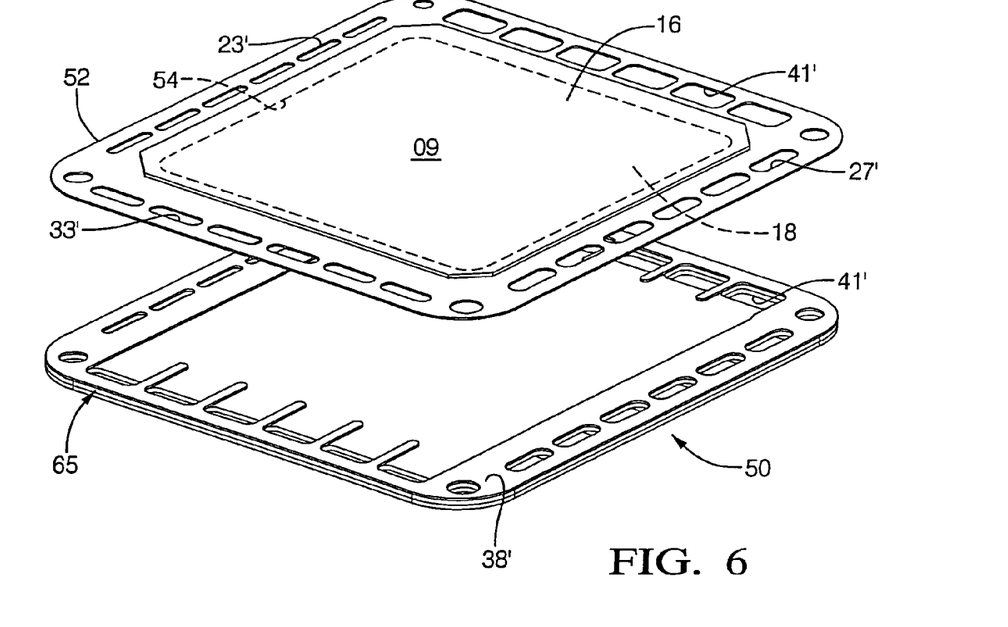
FIG. 6 is an exploded isometric view, showing the separator subassembly ready for joining to form a fuel cell module.
Figure 8:
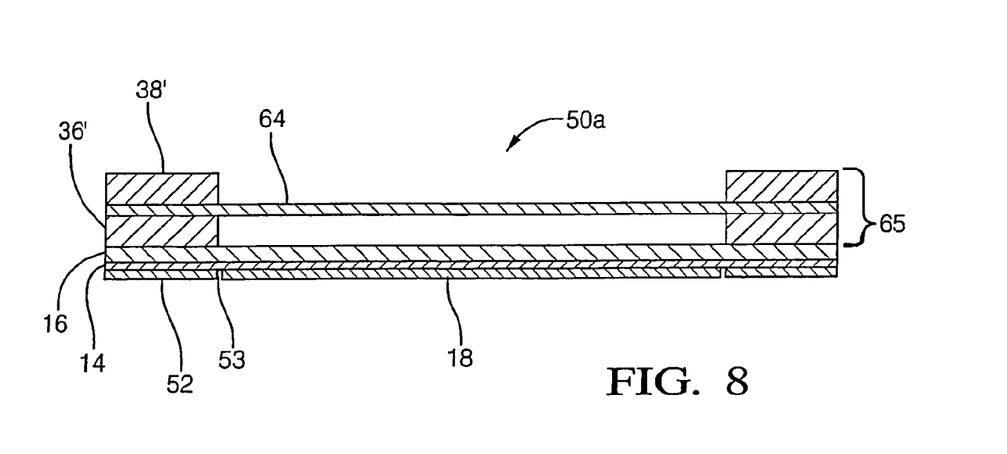
FIG. 8 is an elevational cross-sectional view of one fuel cell module according to the invention wherein the outer members are the anode and anode spacer.
Figure 9:
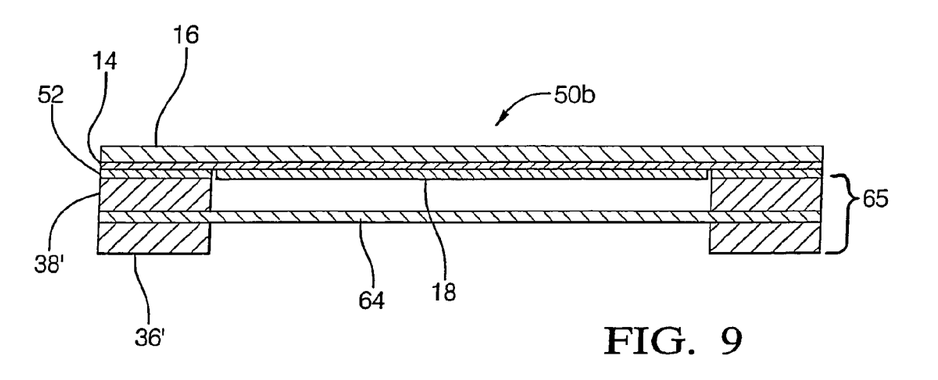
FIG. 9 is an elevational cross-sectional view of a fuel cell module according to the invention wherein the outer members are the anode spacer and the separator.
Figure 10:
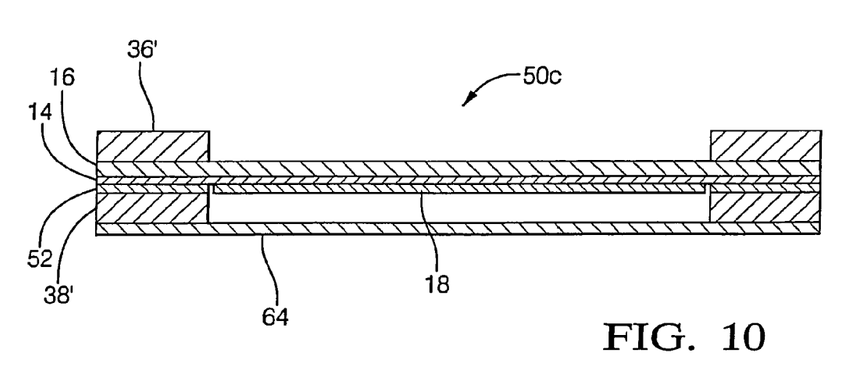
FIG. 10 is an elevational cross-sectional view of a fuel cell module according to the invention wherein the outer members are the separator and the cathode spacer.

The four plates 36',38',52,64 may be joined by any combination of welding or brazing in which the four plates are fusibly joined. Also, they may be assembled (joined) in any order or combination which suits the assembly process. For example, in a preferred assembly sequence, cathode spacer 38' and anode spacer 36' are attached to opposite sides of separator plate 64, as shown in FIG. 4, to provide a separator subassembly 65, shown in FIG. 5. Subassembly 65 is then attached to the cathode side of PEN frame 52, as shown in FIG. 6, to form fuel cell module 50b (FIG. 9). Of course, the spacers, PEN frame, and separator may be ordered in any desired sequence so long as, in a stack formed of a plurality of such modules, the separator is disposed between an anode spacer and a cathode spacer, and the anode spacer is disposed between the anode side of the frame and the separator to form fuel cell module 50a (FIG. 8). Thus, alternative modules, not necessarily using the component sequence of subassembly 65 yet within the scope of the invention, may be formed such as 50c (FIG. 10), wherein the anode spacer is attached to the anode side of the frame and the cathode spacer and separator are attached to the cathode side of the frame; and 50d (FIG. 7), wherein the cathode spacer is attached to the cathode side of the frame and the anode spacer and separator are attached to the anode side of the frame.

Any desired number of modules 50a, 50b, or 50c may be stacked together to form a fuel cell stack 12. For example, in FIG. 7, a stack 12 is being formed by assembling a plurality of individual cells 50a. Note that each module must be electrically isolated from its adjacent modules. Therefore, in a currently preferred embodiment, insulating seals 66 of glass are disposed between modules, preferably on one or the other of spacers 36' and 38'. In a preferred embodiment, the designated sealing spacer is coated with a suitable glass layer or ceramic adhesive prior to assembly of the stack. The stack then is subjected to high pressure and temperature, whereby the glass seals are liquefied and fused. The separators 64 are electrically interconnected in known fashion (not shown) to connect the modules in electrical series.

The sheet thicknesses of the four plates may be readily changed as required to adjust the structural properties or field flow heights. Since these parts may be formed by a blanking process, the tooling can be simple and inexpensive. Alternatively, the plates may be formed by other processes, for example, water-jet cutting. All of these factors make fuel cells in accordance with the invention well-suited to high-volume manufacturing as well as low volume or prototype manufacturing.

A fuel cell assembly in accordance with the invention is especially useful as an auxiliary power unit (APU) for vehicles 132 on which the APU may be mounted as shown in FIG. 3, such as cars and trucks, boats and ships, and airplanes, wherein motive power is supplied by a conventional engine and the auxiliary electrical power needs are met by the SOFC assembly.

A fuel cell assembly in accordance with the invention is also useful as a stationary power plant such as, for example, in a household or for commercial usage.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell module, comprising:
    a) a fuel cell element including an anode, an electrolyte layer, and a cathode;
    b) a frame for receiving said fuel cell element and having a central aperture for exposure of one of said anode or said cathode;
    c) a cathode spacer for defining a cathode air flow space adjacent said cathode;
    d) an anode spacer for defining an anode fuel flow space; and
    e) a separator positioned adjacent to one of said cathode spacer or said anode spacer,
    wherein said cathode spacer is separate and in contact with said frame, wherein at least one of said frame, cathode spacer, anode spacer, or separator is formed by stamping from sheet stock, wherein outer members of said module are said anode spacer and said frame each including an exposed connection surface, wherein at least one of said cathode spacer or said anode spacer is planar and includes a thickness, wherein said thickness determines a height of at least one of said cathode air flow space or said anode fuel flow space.

2. A fuel cell module in accordance with claim 1 wherein each of said frame, cathode spacer, anode spacer, and separator is formed by stamping from sheet stock.

3. A fuel cell assembly in accordance with claim 1 wherein said electrolyte layer includes a solid oxide.

4. A fuel cell module in accordance with claim 1 further comprising a fusible seal on an outer surface of said module for sealing to an adjacent module in a fuel cell stack assembly process.

5. A fuel cell module in accordance with claim 4, wherein said fusible seal includes glass.

6. A fuel cell module in accordance with claim 4, wherein said fusible seal includes ceramic adhesive.

7. A fuel cell stack comprising a plurality of fuel cell modules in accordance with claim 1.

8. A fuel cell module, comprising:
    a) a fuel cell element including an anode, an electrolyte layer, and a cathode;
    b) a frame for receiving said fuel cell element and having a central aperture for exposure of one of said anode or said cathode;
    c) a cathode spacer for defining a cathode air flow space adjacent said cathode;
    d) an anode spacer for defining an anode fuel flow space adjacent said anode; and
    e) a separator positioned adjacent to one of said cathode spacer or said anode spacer,
    wherein at least one of said anode spacer and said cathode spacer is separate and in contact with said frame, wherein at least one of said frame, cathode spacer, anode spacer, or separator is formed by stamping from sheet stock, and wherein outer members of said module are said separator and said anode spacer each including an exposed connection surface, wherein at least one of said cathode spacer or said anode spacer is planar and includes a thickness, wherein said thickness determines a height of at least one of said cathode air flow space or said anode fuel flow space.

9. A fuel cell module in accordance with claim 8 wherein each of said frame, cathode spacer, anode spacer, and separator is formed by stamping from sheet stock.

10. A fuel cell assembly in accordance with claim 8 wherein said electrolyte layer includes a solid oxide.

11. A fuel cell module in accordance with claim 8 further comprising a fusible seal on an outer surface of said module for sealing to an adjacent module in a fuel cell stack assembly process.

12. A fuel cell module in accordance with claim 11, wherein said fusible seal includes glass.

13. A fuel cell module in accordance with claim 11, wherein said fusible seal includes ceramic adhesive.

14. A fuel cell stack comprising a plurality of fuel cell modules in accordance with claim 8.

15. A fuel cell module, comprising:
a) a fuel cell element including an anode, an electrolyte layer, and a cathode;
b) a frame for receiving said fuel cell element and having a central aperture for exposure of one of said anode or said cathode;
c) a cathode spacer for defining a cathode air flow space adjacent said cathode;
d) an anode spacer for defining an anode fuel flow space adjacent said anode; and
e) a separator positioned adjacent to one of said cathode spacer or said anode spacer,
wherein at least one of said anode spacer and said cathode spacer is separate and in contact with said frame, wherein at least one of said frame, cathode spacer, anode spacer, or separator is formed by stamping from sheet stock, and wherein outer members of said module are said cathode spacer and said separator each including an exposed connection surface, wherein at least one of said cathode spacer or said anode spacer is planar and includes a thickness, wherein said thickness determines a height of at least one of said cathode air flow space or said anode fuel flow space.

16. A fuel cell module in accordance with claim 15 wherein each of said frame, cathode spacer, anode spacer, and separator is formed by stamping from sheet stock.

17. A fuel cell assembly in accordance with claim 15 wherein said electrolyte layer includes a solid oxide.

18. A fuel cell module in accordance with claim 15 further comprising a fusible seal on an outer surface of said module for sealing to an adjacent module in a fuel cell stack assembly process.

19. A fuel cell module in accordance with claim 18, wherein said fusible seal includes glass.

20. A fuel cell module in accordance with claim 18, wherein said fusible seal includes ceramic adhesive.

21. A fuel cell stack comprising a plurality of fuel cell modules in accordance with claim 15.

22. A fuel cell assembly comprising a fuel cell stack including a plurality of fuel cell modules, each of said modules including,
a fuel cell element including an anode, an electrolyte layer, and a cathode,
a frame for receiving said fuel cell element and having a central aperture for exposure of one of said anode or said cathode,
a cathode spacer for defining a cathode air flow space adjacent said cathode,
an anode spacer for defining an anode fuel flow space, and
a separator positioned adjacent to one of said cathode spacer or said anode spacer,
wherein said cathode spacer is separate and in contact with said frame, wherein at least one of said frame, cathode spacer, anode spacer, or separator is formed by stamping from sheet stock, wherein outer members of said module are said anode spacer and said frame each including an exposed connection surface, wherein at least one of said cathode spacer or said anode spacer is planar and includes a thickness, wherein said thickness determines a height of at least one of said cathode air flow space or said anode fuel flow space.

23. A motorized vehicle comprising, a fuel cell stack including a plurality of fuel cell modules, each of said modules including,
a fuel cell element including an anode, an electrolyte layer, and a cathode,
a frame for receiving said fuel cell element and having a central aperture for exposure of one of said anode or said cathode,
a cathode spacer for defining a cathode air flow space adjacent said cathode,
an anode spacer for defining an anode fuel flow space, and
a separator positioned adjacent to one of said cathode spacer or said anode spacer,
wherein said cathode spacer is separate and in contact with said frame, wherein at least one of said frame, cathode spacer, anode spacer, or separator is formed by stamping from sheet stock, wherein outer members of said module are said anode spacer and said frame each including an exposed connection surface, wherein at least one of said cathode spacer or said anode spacer is planar and includes a thickness, wherein said thickness determines a height of at least one of said cathode air flow space or said anode fuel flow space.

* * * * *